(12) United States Patent
Baugh

(10) Patent No.: US 12,516,658 B2
(45) Date of Patent: Jan. 6, 2026

(54) METHOD OF ERECTING A WIND TURBINE

(71) Applicant: Benton Frederick Baugh, Houston, TX (US)

(72) Inventor: Benton Frederick Baugh, Houston, TX (US)

(73) Assignee: OKLAHOMA CHRISTIAN UNIVERSITY, Edmond, OK (US)

( * ) Notice: Subject to any disclaimer, the term of this patent is extended or adjusted under 35 U.S.C. 154(b) by 291 days.

(21) Appl. No.: 18/375,017

(22) Filed: Sep. 29, 2023

(65) Prior Publication Data
US 2025/0109735 A1    Apr. 3, 2025

(51) Int. Cl.
*F03D 13/10*    (2016.01)
*F03D 13/20*    (2016.01)

(52) U.S. Cl.
CPC ....... *F03D 13/139* (2023.08); *F03D 13/2005* (2023.08); *F05B 2230/61* (2013.01)

(58) Field of Classification Search
CPC ....... Y02E 10/72; Y02E 10/728; Y02E 70/30; Y02E 10/50; F03D 13/20; F03D 13/10
See application file for complete search history.

(56) References Cited

U.S. PATENT DOCUMENTS

| | | | | |
|---|---|---|---|---|
| 4,221,088 A * | 9/1980 | Patterson | ................ | E04H 12/34 52/120 |
| 6,782,667 B2 * | 8/2004 | Henderson | .............. | E04H 12/34 52/118 |
| 7,621,410 B1 * | 11/2009 | Updegrove | ........... | B66C 23/206 212/270 |
| 7,726,497 B1 * | 6/2010 | Updegrove | ........... | B66C 23/206 212/271 |
| 9,388,599 B2 * | 7/2016 | Homsi | ..................... | F03D 13/20 |
| 9,605,659 B2 * | 3/2017 | Haar | ................... | E04B 1/34336 |
| 9,878,762 B2 * | 1/2018 | Pfuetzenreuter | ........ | B63B 27/10 |
| 10,738,497 B1 * | 8/2020 | Groleau | ................ | E04H 12/345 |
| 10,788,016 B2 * | 9/2020 | Barber | ....................... | F03D 9/32 |
| 11,592,004 B2 * | 2/2023 | Karasawa | ............. | F03B 17/061 |
| 12,031,345 B2 * | 7/2024 | Cochrane | ............ | E04H 12/2261 |
| 12,116,249 B2 * | 10/2024 | Fenger | .................... | F03D 13/10 |
| 12,234,634 B2 * | 2/2025 | Akagawa | .................. | E04H 1/12 |
| 12,258,207 B2 * | 3/2025 | Newman | .............. | B65D 90/125 |
| 2005/0109735 A1 * | 5/2005 | Flood | ...................... | B23K 9/167 219/146.21 |

(Continued)

OTHER PUBLICATIONS

U.S. Appl. No. 13/587,187, filed Apr. 3, 2012, Benton F. Baugh.

*Primary Examiner* — Brian E Glessner
*Assistant Examiner* — Daniel J Kenny

(57) ABSTRACT

The method of erecting a wind turbine, comprising pivotably mounting the lower end of a mast on a side or end of a container, connecting a first wire, rope, cable, or chain to the upper end of the mast and to the top end of an intermediate truss, connecting a second wire, rope, cable, or chain to the top end of the intermediate truss and to a winch, pivotably fixing a lower end of the intermediate truss to the container, operating the winch to support a portion of the weight of the mast, assembly the wind turbine on the mast, operate the winch to move the mast and wind turbine to the vertical position, engage a second connection to fix the mast in the vertical position, and releasing the wire, rope cable or chain from the upper end of the truss.

17 Claims, 9 Drawing Sheets

(56) References Cited

U.S. PATENT DOCUMENTS

| | | | |
|---|---|---|---|
| 2006/0137348 A1* | 6/2006 | Pas | F03D 9/19 |
| | | | 60/641.1 |
| 2018/0274258 A1* | 9/2018 | Newman | E04B 1/34352 |
| 2019/0356035 A1* | 11/2019 | Dominguez | E04H 12/182 |
| 2024/0301866 A1* | 9/2024 | Ansari | F03D 9/007 |
| 2025/0003389 A1* | 1/2025 | Shaw | F03D 13/20 |

* cited by examiner

METHOD OF ERECTING A WIND TURBINE

TECHNICAL FIELD

This invention relates to the method of erecting a moderately sized wind turbine without needing cranes or other heavy equipment.

BACKGROUND OF THE INVENTION

Wind turbines have the potential to be and should be a sustaining economic supply of green energy for the United States and the world.

Wind turbines were optimized in the nineteenth century by theories and a lot of empirical evidence, yielding a common design which farmers have used for pumping water ever since. The designs generally favored several blades with a lot of blade surface area.

For a variety of reasons, more recent wind turbines have favored few blades, typically three, with a minimal surface area and a highly profiled shape.

The following is a direct quotation taken from the internet "The best overall formula for the power derived from a wind turbine (in Watts) is P=0.5 Cp $\rho$ $\pi R^2$ $V^3$, where Cp is the coefficient of performance (efficiency factor, in percent), $\rho$ is air density (in kg/m3), R is the blade length (in meters) and V is the wind speed (in meters per second)." Note: $\pi R^2$ is the area the blades sweep or the swept area, (Number 1 result in an internet search for wind power formula.)

Also, "The wind energy formula is given by P=0.5*$\rho$*A*V^3, where, P=power, $\rho$=air density, A=swept area of blades given by A=$\pi$*$R^2$ where R is the radius of the blades, V=velocity of the wind." (From BYJU'S Learning Program)

These (and many other similar references) indicate that wind power is a function of the area the blades sweep rather than the blade area itself. It is sort of like saying an airplane flew from Houston to Oklahoma City and the lift of the wings was a function of the flight path from Houston to Oklahoma City rather than the area of the wings.

It is our understanding based on our experience of substantial testing of our own that wind energy is not a function of the area the blades sweep as conventionally understood, but rather of actual blade area as the nineteenth century farmers figured out.

It is reasonable to say that today wind turbines are not economically viable as they are only installed where there are government grants to at least partially pay for them, if not completely.

Optimizing wind turbines on the basis of blade area rather than swept area substantially changes how you would design blades. It generally changes you to getting as much area you can in a small diameter rather than having inordinately long blades to optimize swept area. It is our testing experience that in doing this, you can generate at least ten times as much wind energy in the same swept area as the contemporary designs.

By changing the design of wind turbines to optimize based on blade area will represent new methodologies of design and construction. Some of these will be radically different blade designs, substantially different tower designs as blades will be shorter and will not require tall towers for support, new needs for blade angle control and centrifugal releases as large blade areas will tend to over speed in high winds, The more compact blades will allow portable wind turbines which can power small communities. Different philosophies will be addressed in wind turbines which can be used in direct current service where blade rotational speed is a secondary consideration and in service where you feed to an alternating current grid and the cycle timing is critical.

The present design philosophies have yielded wind turbines which are so enormous that it takes massive trucks to carry the components down the roads to erect them and enormous cranes to erect them. In a small scale which might be erected without these cranes, the power out would be so low as to not make them worth investigating.

We have been designing wind turbines by the swept area optimization method for at least 70 years. It is time to address optimizing wind turbines on blade area and make the wind power industry a tax paying industry rather than a tax consuming industry.

BRIEF SUMMARY OF THE INVENTION

The object of this invention is to provide a method of collecting wind energy with a wind turbine based on optimizing the blade area rather than be blade swept area.

A second object of this invention is make a wind turbine which is large enough to provide significant power while remaining small enough to be manually erected.

A third objective of this invention is lower the wind turbine to ground level for maintenance.

Another objective of this invention is to make the wind turbine transportable to the job site in a standard shipping container.

Another objective of this invention is to make the shipping container it was shipped in become the base for the wind turbine.

Another objective of this invention is to provide for generated power storage in the container.

Another objective of this invention is to provide electrical distribution equipment within the container.

DETAILED DESCRIPTION OF THE INVENTION

Figure 1:
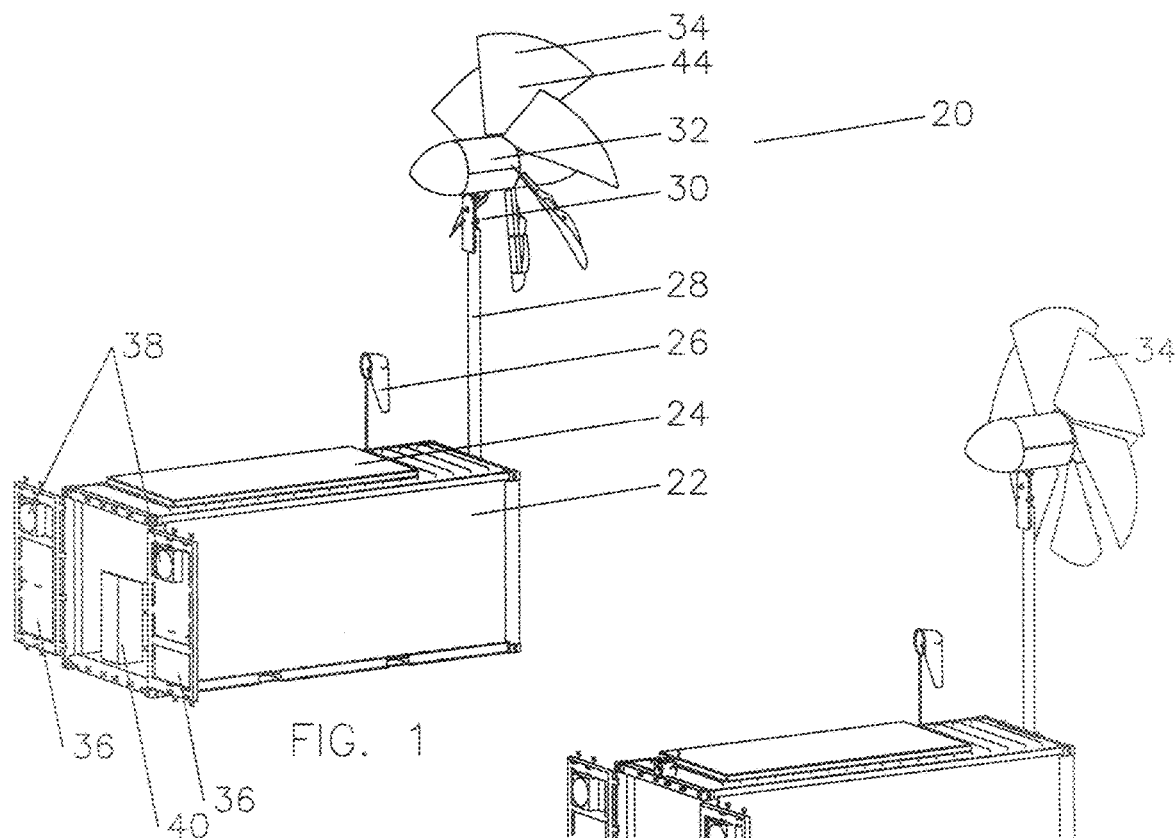
FIG. 1 is a perspective view of a wind turbine system which would use the features of this invention, and illustrates the blades at about a 30 degree angle to the plane of rotation.

Referring now to FIG. 1, a perspective view of a complete wind turbine system 20 is shown in order to illustrate the utility of the present invention. Container 22 can be a custom-made structure or a standard shipping container. Solar cells 24 can be mounted on the top of container 22 to provide solar power in addition to wind power. Windsock 26 is shown to indicate wind direction. Mast 28 includes swivel bearings 30 which pivotably support the wind turbine pod 32 which in turn supports the blades 34. The blades 34 are shown at about a 30° angle to the wind direction as generally the best angle for harvesting the most power. The blades 34 are full area blades to gain the maximum power, as the three skinny blades typically in the field catch very little wind to harvest wind power. The doors 36 to the container are shown open with speakers 38 mounted on them. A lectern 40 is shown to allow a lecturer to speak to a crowd using the speakers 38. The side 44 of the blades 34 which face the wind are behind the swivel bearings 30 so that the wind turbine will always face into the wind.

Figure 2:
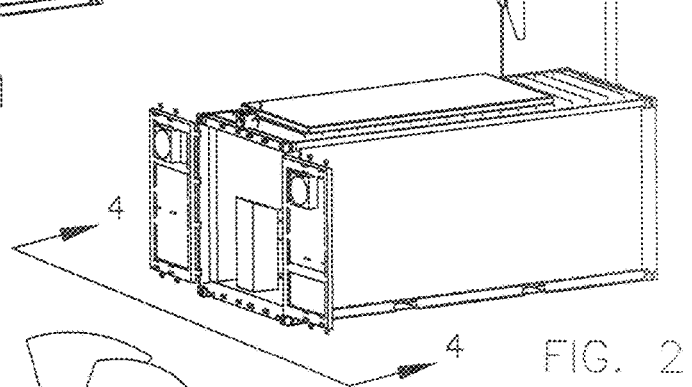
FIG. 2 is a perspective view of a wind turbine system which would use the features of this invention, and illustrates the blades at about a 10 degree angle to the plane of rotation.

Referring now to FIG. 2, a similar perspective view as FIG. 1 is shown with the blades 34 faired or turned to a moderate angle such as 10° which will be more beneficial in low wind conditions.

Figure 3:
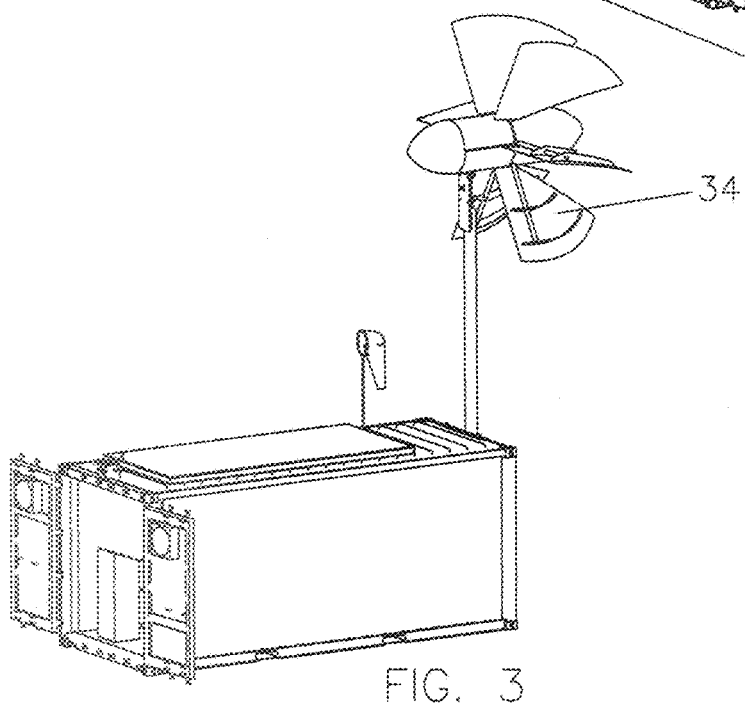
FIG. 3 is a perspective view of a wind turbine system which would use the features of this invention, and illustrates the blades at about a 90 degree angle to the plane of rotation.

Referring now to FIG. 3, a similar perspective view as FIG. 1 is shown with the blades 34 faired or turned to an extreme angle such as 90° which will allow the blades to withstand hurricane conditions. The blades 34 can be faired to any angle between 10° and 90° to optimize the power drawn from the wind.

Figure 4:
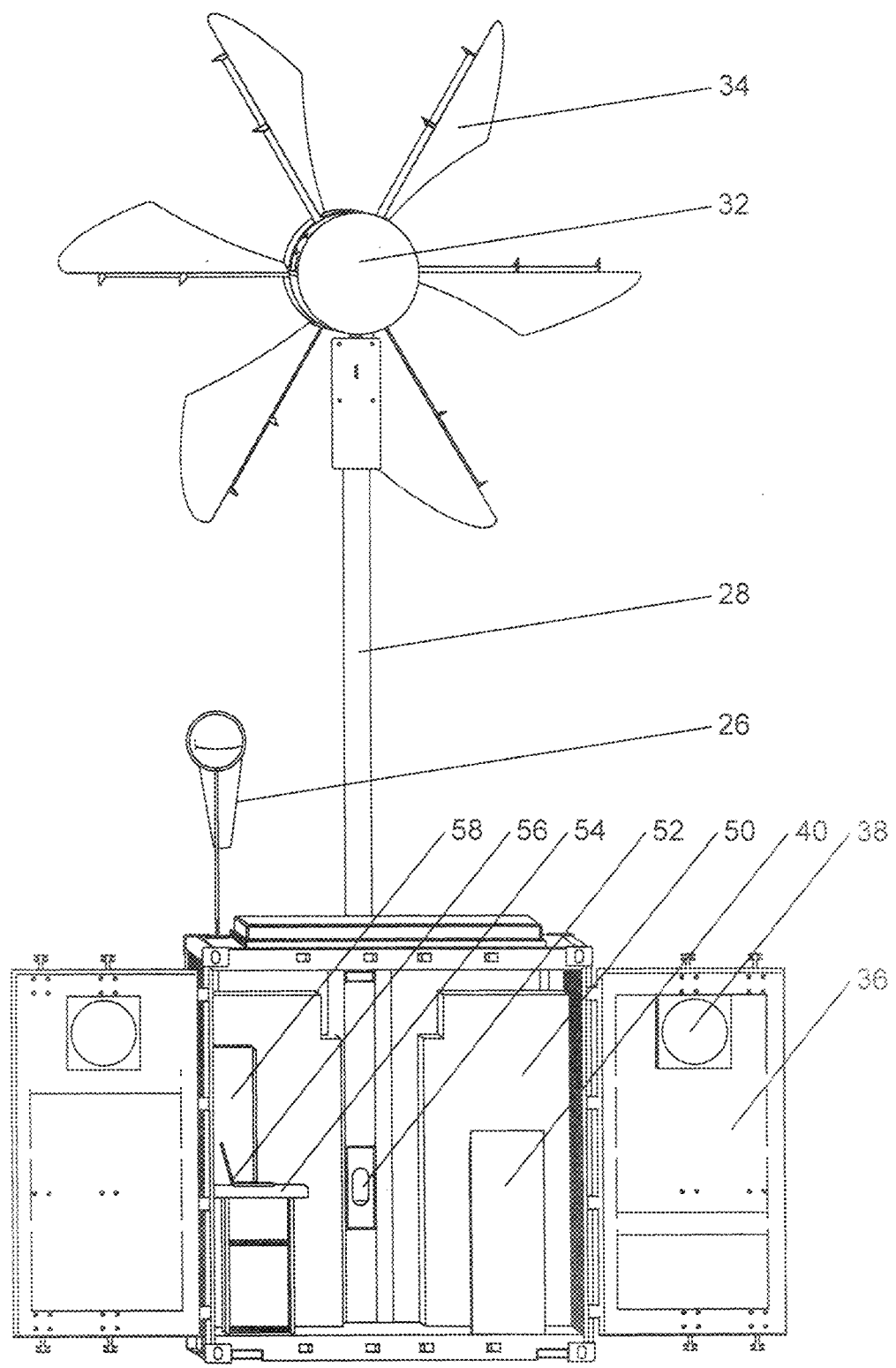
FIG. 4 is an end view of a wind turbine system taken along lines "4-4" of FIG. 2 which would use the features of this invention showing the internal equipment which would be used.

Referring now to FIG. 4, which is taken along lines "4-4" of FIG. 2 and shows storage batteries 50, lower end 52 of mast 28, office desk 54, computer 56, and power distribution panel 58.

Figure 5:
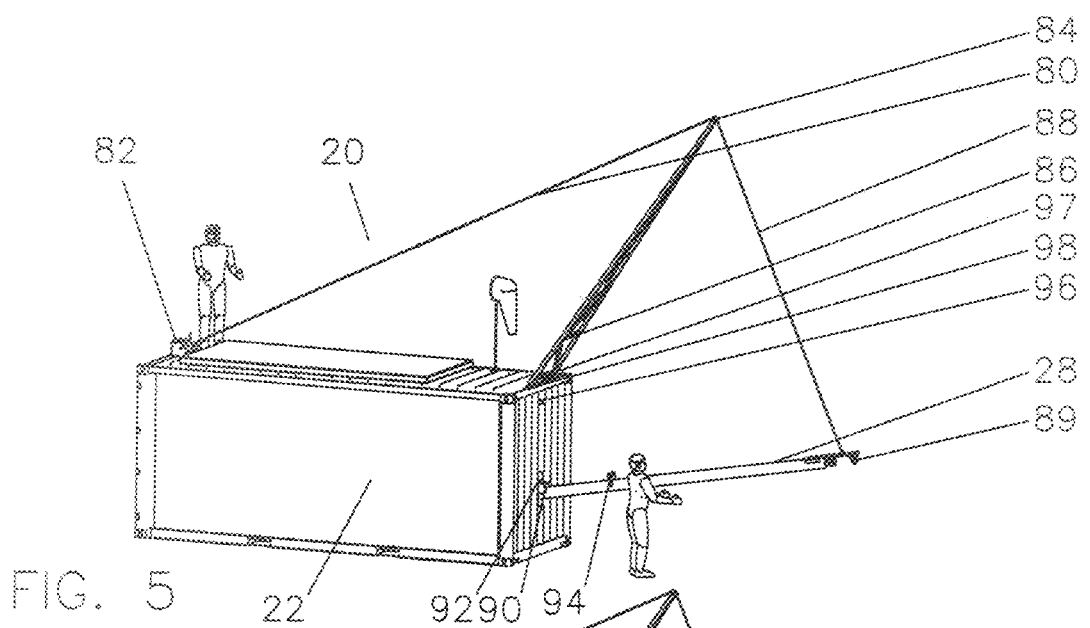
FIG. 5 is a perspective view of a wind turbine system which would use the features of this invention illustrating the mast being erected without a crane.

Referring now to FIG. 5, a perspective view of the wind turbine system 20 is shown with a first cable, wire, rope, or chain 80 attached to a winch 82 on one end and to the upper end 84 of a lightweight truss 86 on the other end. It also shows a second cable, wire, rope, or chain 88 attached to the upper end 64 of lightweight truss 86 on one end and to the upper end 89 of mast 28 on the other end. The lower end 90 of mast 28 is shown engaged with pivotable mount 92. Upper mount 94 will engage mounting location 96 when the mast is raised.

After the mast 28 is connected to the container 22 and the cables, wires, ropes, or chains 80 and 88 are attached to the top of the lightweight truss 86, the lower end 97 of the lightweight truss 86 is connected to a pivotable foot 98 on the top of the container 22. Winch 82 can then be used to raise the mast 28 to the position as shown in FIG. 5.

Figure 6:
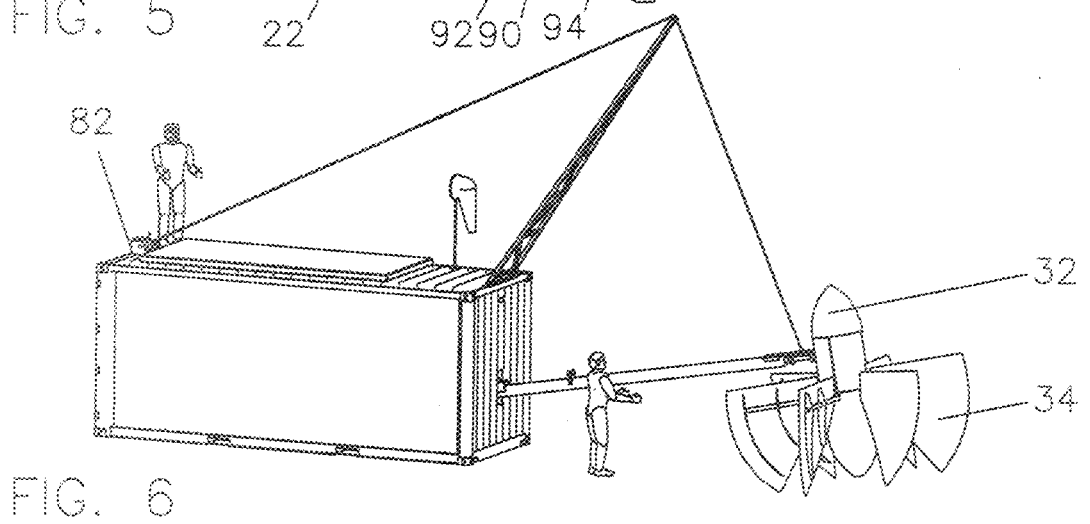
FIG. 6 is a perspective view of a wind turbine system similar to FIG. 5 showing the wind turbine being attached to the top of the mast near ground level.

Referring now to FIG. 6, which is a perspective view similar to FIG. 5 showing the wind turbine pod 32 and the blades 34 installed from a convenient ground level position.

Figure 7:
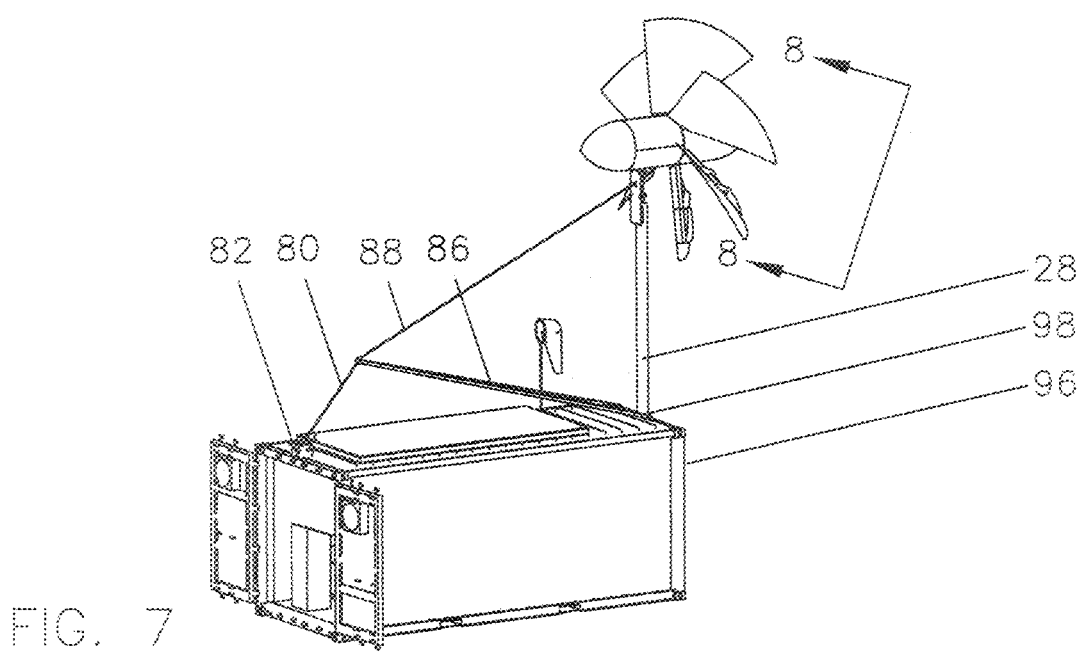
FIG. 7 is a perspective view of a wind turbine system similar to FIG. 6 rotated slightly and showing the wind turbine raised to the vertical mode of the mast.

Referring now to FIG. 7, winch 82 has been operated to bring the mast 28 to the full vertical position, and a pinned connection has been made at 96 (see FIG. 5). At this time the connection at the pivotable foot 98 can be released. This wilt allow the lightweight truss 86 to be lowered to the ground with the winch 82 and the cables, wires, ropes, or chains 80 and 88 to be released. The cable, wire, rope, or chain 80 can be rolled up on the winch 82 for storage and the cable, wire, rope, or chains 88 can remain attached to the upper end 89 of the mast 28 for use in future servicing operations. This process can be reversed to bring the wind turbine down to ground level for convenient servicing in the future.

Figure 8:
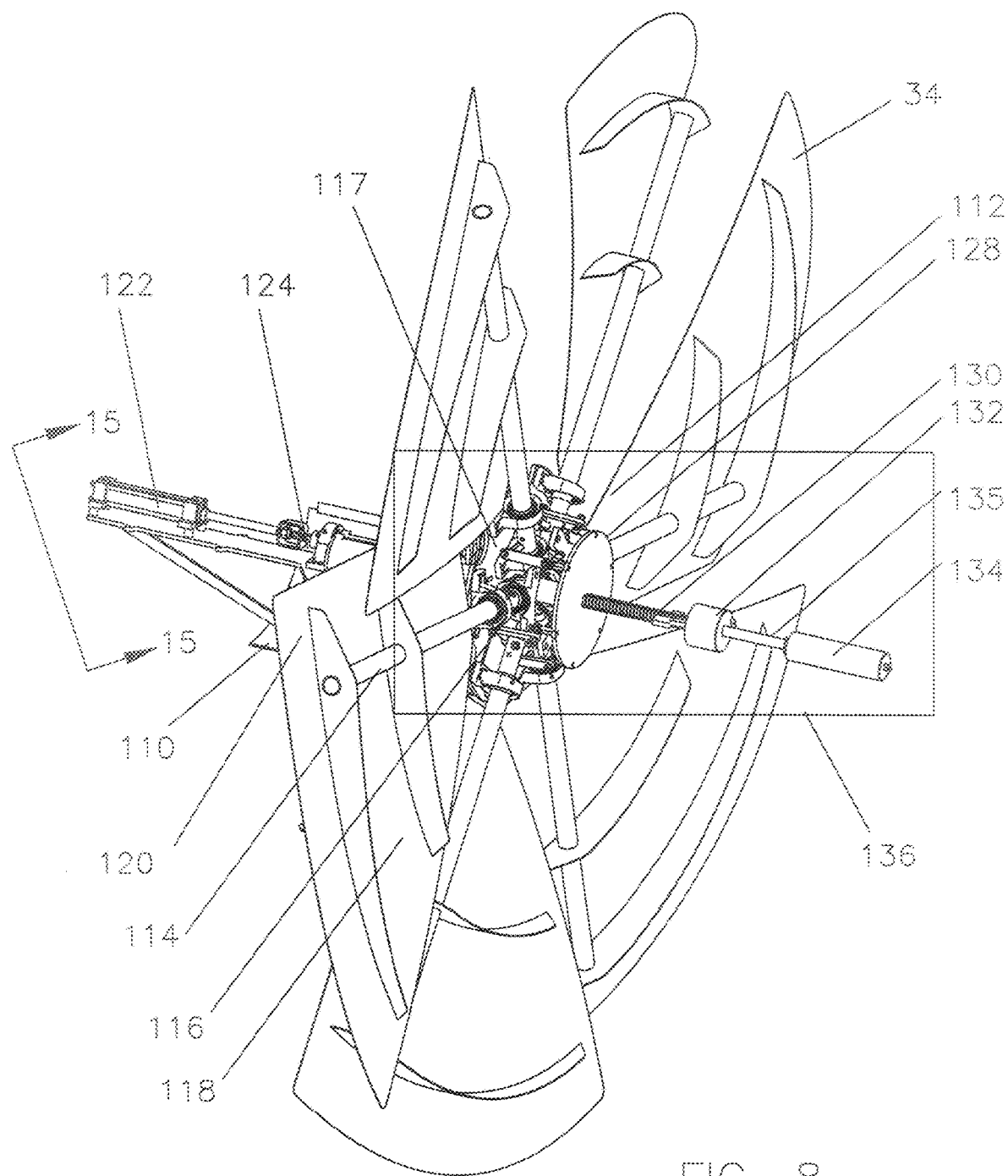
FIG. 8 is a perspective view taken along lines "8-8" of FIG. 7 showing an overview of a fairing box which is sensitive to the wind load.

Referring now to FIG. 8, a perspective view of the workings of a wind turbine whose blade angle is sensitive to the wind load are shown which are generally taken along lings "8-8" of FIG. 7. A majority of the cowling is removed with only a portion remaining at 110. The fairing mechanism 112 will be described in detail in the following figures. In the embodiment illustrated in FIG. 8, the blades 34 pivot about a radial axles 114 which rotate about bearings 116 which are mounted on faceplate 117. The blades 34 have a larger surface area 118 on one side of axles 114 than on the other side 120 of axles 114 to give a twisting moment on the axles 114 when the wind blows. Cylinder 122 provides for resetting the blades after they have been completely faired to the 90° position in a high wind. Bearings 124 allow the parts to the right of the bearings to rotate while the parts to the left in this figure do not rotate. Fairing mechanism 112 is shown with release plate 128 which receives the moment force from the blades through linkages and pushes against spring 130 allowing the angle of the blades 34 to be responsive to the wind load. Centrifugal release 132 will be described later. Resetting sleeve 134 will reset the centrifugal release 130 after a high wind event has ended. Resetting sleeve 134 is connected by an internal rod 135 to the cylinder 122 to do this. Box 136 is the fairing mechanism 112 which will be described in FIGS. 9-11.

Figure 9:
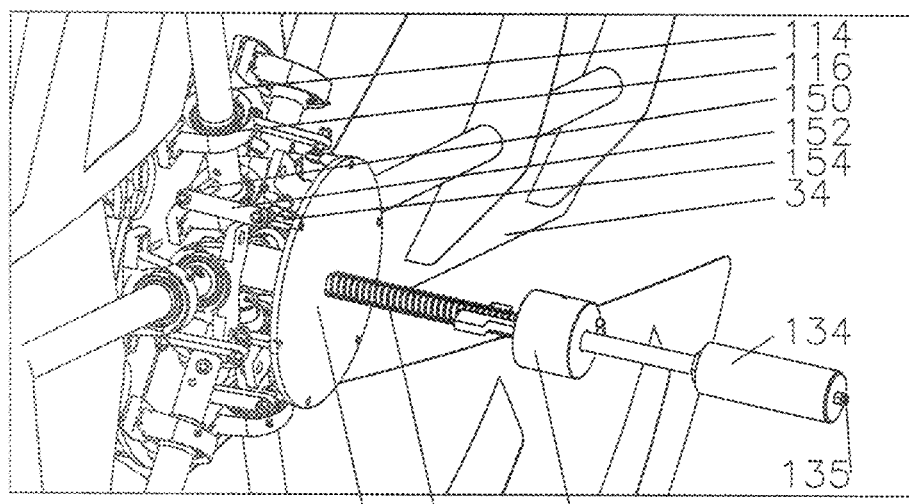
FIG. 9 is a perspective view taken from box 136 of FIG. 8 which shows blades in about a ten-degree position relative to the plane of rotation.

Referring now to FIG. 9, a partial section of the view of FIG. 8 is shown taken along Box 136 showing the axle 114 rotating in bearings 116 and having a moment arm 150 on axle 114, with a link 152 mounted on the end of the moment arm 150 on one end and mounted on a swivel post 154 on the other end. The swivel post 154 is mounted on the release plate 128. Release plate 128 is loaded by spring 130 and the blade angle will be a balance between the spring load and the wind load.

Figure 10:
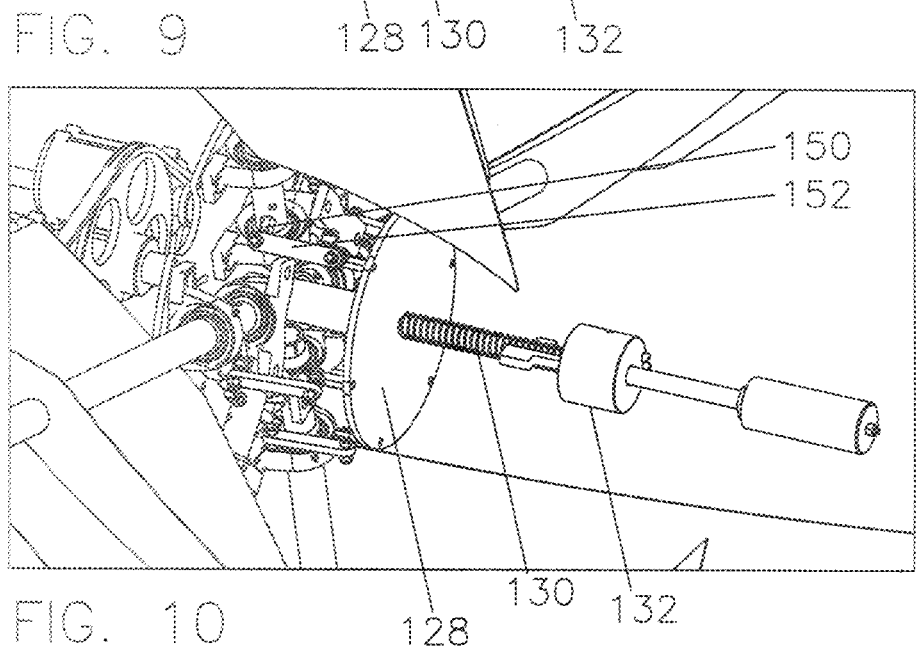
FIG. 10 is a perspective view taken from box 136 of FIG. 8 which shows blades in about a forty-five-degree position relative to the plane of rotation.

Referring now to FIG. 10 which is a view similar to FIG. 9, the wind load has increased and the moment arm 150 has been rotated, moving link 152, and release plate 128 backwards or to the left in this figure.

Figure 11:
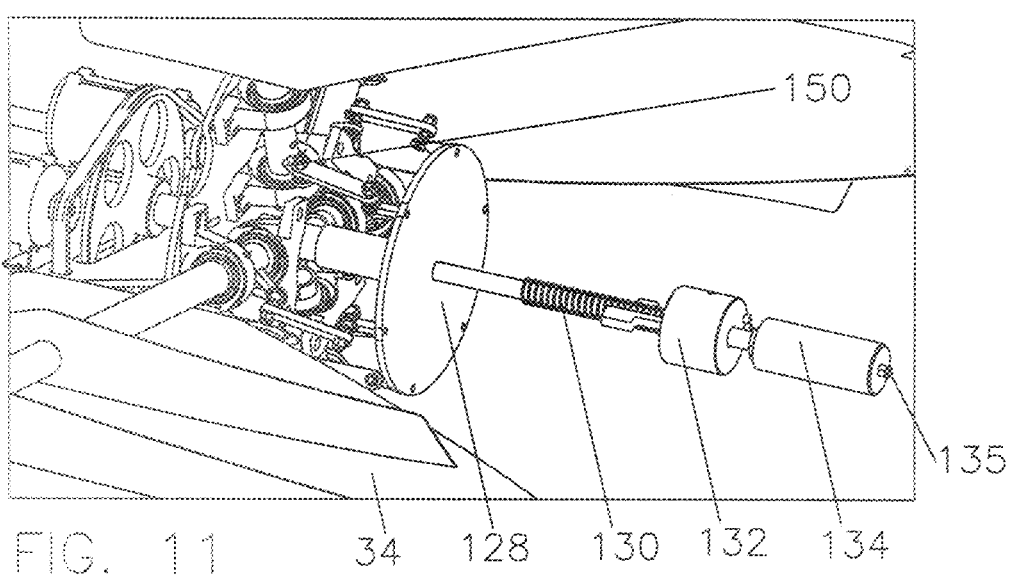
FIG. 11 is a perspective view taken from box 136 of FIG. 8 which shows blades in about a ninety-degree position relative to the plane of rotation as it would be after the centrifugal release has been released.

Referring now to FIG. 11 which is a view similar to FIG. 9, the wind load has increased to an unsafe level causing the blades to spin at an unsafe speed. The centrifugal release 132 has been released and the blades 34 have moved to the fully faired position. When the wind had died down, the cylinder 122 on the front of the wind turbine will be activated and the resetting sleeve 134 will return the wind turbine to the operational state.

Figure 12:
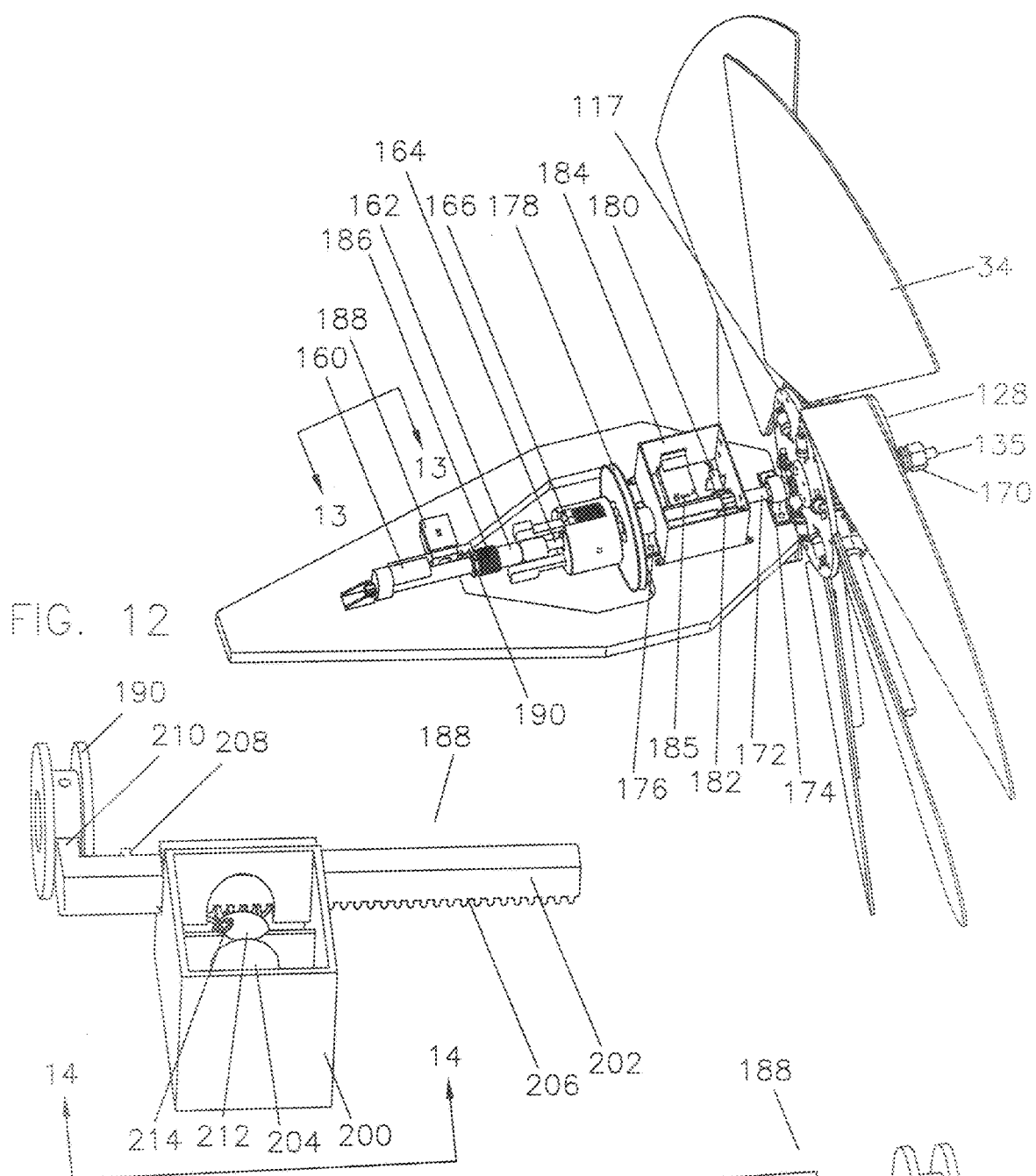
FIG. 12 is a perspective view similar to FIG. 8 slightly rotated showing the components of a linear actuator actuated fairing system.

Referring now to FIG. 12 which is a view similar to FIG. 8 rotated slightly and shows a fairing mechanism controlled by a computer system rather than being directly responsive to the wind load. Linear actuator 160 is connected to swivel 162 which is connected to rod 164 which is connected to centrifugal release 166 which is connected to internal rod 135. Release plate 128 is connected to internal rod 135 by fitting 170. As linear actuator 160 extends, centrifugal release 164, internal rod 135 and release plate 128 will move to the right in FIG. 12, causing the blades 34 to be faired to a greater angle. Blades 34 are mounted on faceplate 117 which is mounted on axle 172 which rotates in bearings 174 and 176. Pulley or sprocket 178 is mounted on the end of axle 172 and transmits the generated power to generators or pumps (not seen here). Sensor 180 detects the rotation of sleeve 182 which is mounted on axle 172 to give the rotary speed of the blades 34. The blades 34 rotate in a plane of rotation which, is perpendicular to the centerline of axle 172.

Control box 184 contains control components such as the sensor 180, batteries 185, and computer components such as a Raspberry Pi which will communicate via Bluetooth with another computer or a smartphone. Washers 186 can be used to adjust the limits of the stroke of the linear actuator 160. Position sensor 188 will read the position of the linear actuator by engagement with spool 190. The position of the actuator and the load from the generator, alternator or pump as input through the pulley or sprocket 178 will be used to control the rotary speed of the wind turbine.

Figure 13:
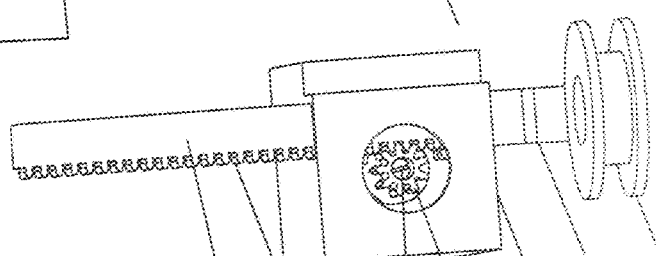
FIG. 13 is an enlarged perspective view of a position sensor taken along lines "13-13" of FIG. 12 showing the rheostat.

Referring now to FIG. 13 which is taken along lines "13-13" of FIG. 12, position sensor 188 is shown in a larger scale having a box 200, a slide arm 202, and a rheostat 204. The slide arm 202 has a gear rack 206, a stop 208, and an extension 210. The extension 210 fits snuggly within the walls of spool 190 so that the position of the spool 190 and therefore the linear actuator 160 will be accurately measured. The rheostat 204 has a spur gear 212 which has a set screw 214.

Figure 14:
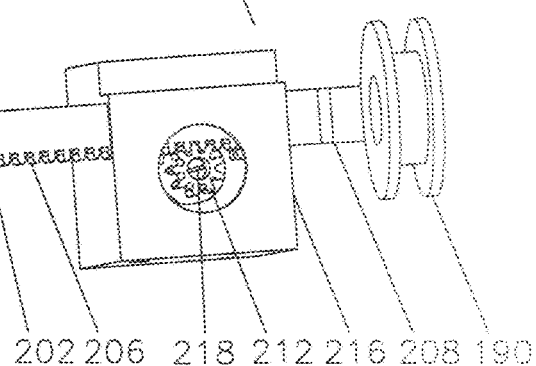
FIG. 14 is an enlarged perspective view of a position sensor taken along lines "14-14" of FIG. 13 showing the spur gear on the rheostat engaging the rack on the slide arm.

Referring now to FIG. 14 which is taken along lines "14-14" of FIG. 13 showing spur gear 212 engaging gear rack 206. As gear rack 206 is moved back and forth by the movement of the spool 190, the spur gear 212 and therefore the rheostat 204 will be rotated, sending a signal to the control box 184. Calibration of the system is done by releasing the set screw 214, moving the slide arm 202 to the left until stop 208 hits the side 216 of the box 200, rotating the rheostat 204 to the stop using the slot 218, and retightening the set screw 214.

Figure 15:
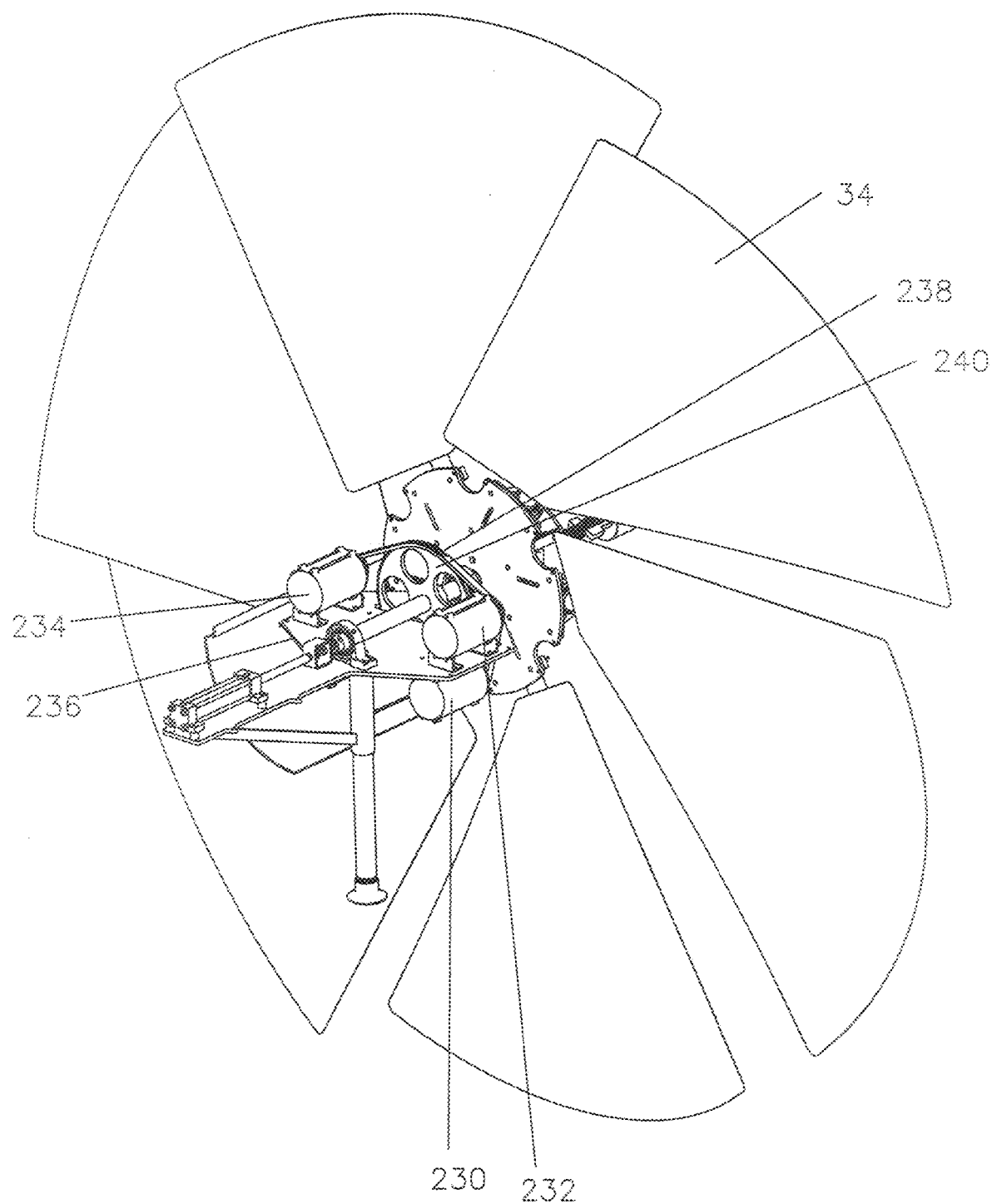
FIG. 15 a perspective view similar to FIG. 12 slightly rotated showing the components of a generator drive system.

Referring now to FIG. 15, a perspective view of a portion of a wind turbine taken along lines "15-15" of FIG. 8 is shown with generators, alternators, or pumps 230, 232, 234, and 236 (not seen) driven by chain or belt 238 which is in turn driven by sprocket or pulley 240.

Figure 16:
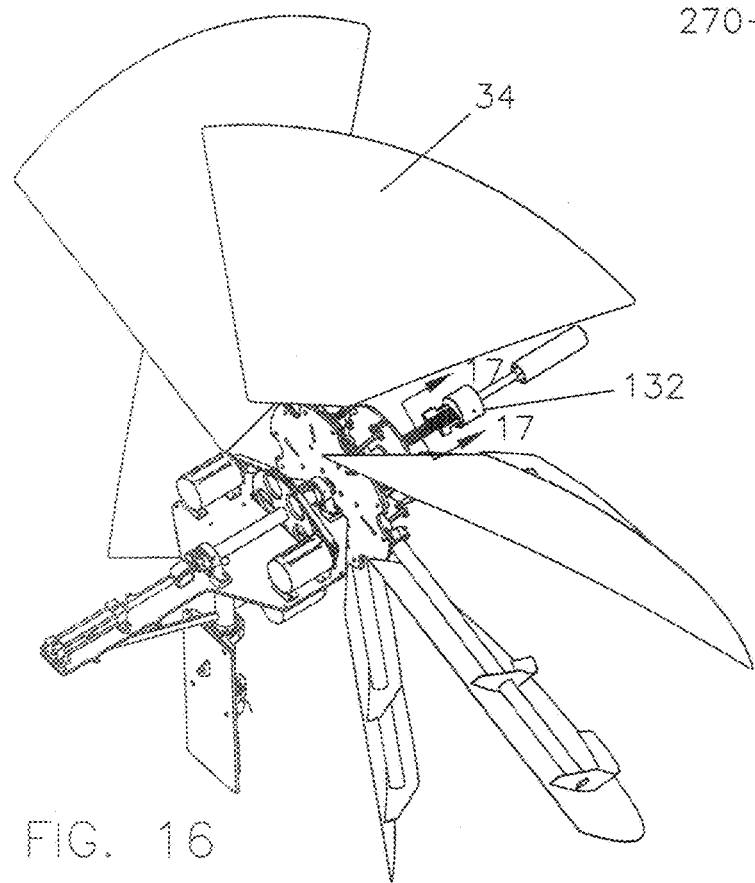
FIG. 16 a perspective view similar to FIG. 15 illustrating the components of the centrifugal release system.

Referring now to FIG. 16, which is a perspective view similar to FIG. 15 with the blades 34 faired slightly to illustrate the centrifugal release 132.

Figure 17:
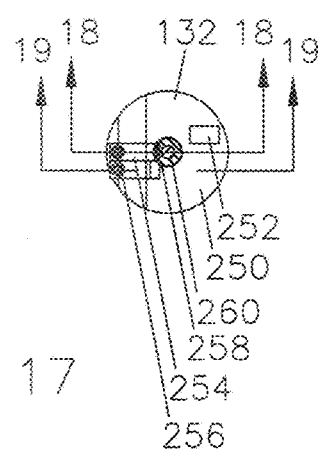
FIG. 17 is a view of the centrifugal release taken along lines "17-17" of FIG. 16.

Referring now to FIG. 17, which is a portion of FIG. 16 taken along lines "17-17". Centrifugal release 132 has a body 250, a counterbalance arm 252, a latch arm 254, a release arm 256 an axle 258 and a reset rod 260.

Figure 18:
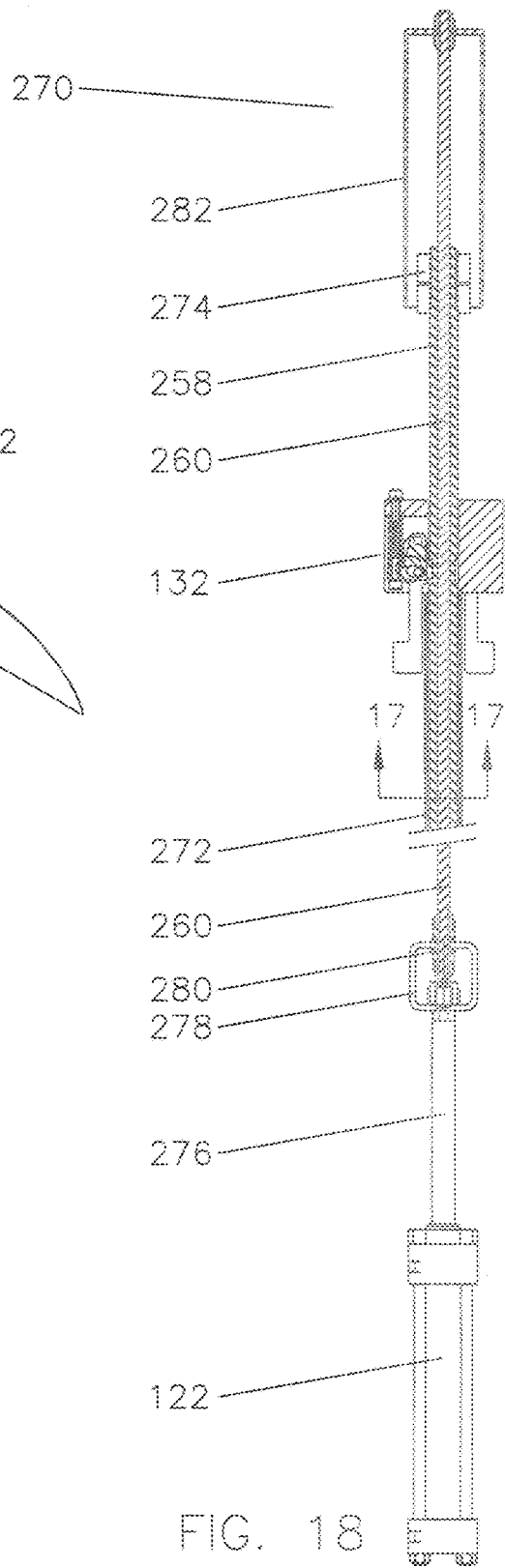
FIG. 18 is a view of the centrifugal release system taken along lines "18-18" of FIG. 17.

Referring now to FIG. 18, a view of the centrifugal release system 270 is shown with the centrifugal release 132 mounted on axle 258 and having spring 272 providing a spring load. When the centrifugal release 132 releases, it will move up in FIG. 18 towards stop nuts 274. When the wind has died down, resetting cylinder 122 will extend its rod 276 which pushes bracket 278. Bracket 278 can be made of a short piece of square tubing with holes drilled in the side. Bearings 280 connect bracket 278 to reset rod 260 which connects to resetting sleeve 282. When cylinder 122 is retracted, it will use resetting sleeve 282 to move centrifugal release 132 back to its original position and then return resetting sleeve 282 to the position shown in this figure.

Figure 19:
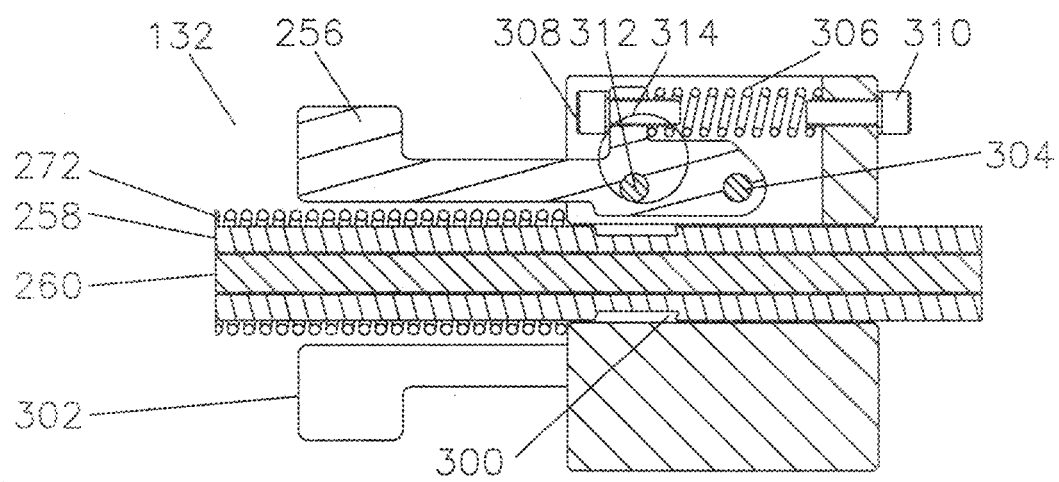
FIG. 19 is a cross section view of the centrifugal release taken along lines "19-19" of FIG. 17 showing the centrifugal release in the non-released condition.

Referring now to FIG. 19 which is a partial section taken along lines "18-18" on FIG. 17 centrifugal release 132 is shown in the unreleased or set condition. Shoulder 300 on axle 258 is shown for engagement by latch arm 254, but the engagement is not actually seen in this view. Counterweight arm 302 is provided for keeping the centrifugal release 132 approximately balance during normal operations. Release arm 256 is pivotably mounted about axle 304 and is restrained in position by spring 306 which is captured between bolts 308 and 310. When release arm 256 is fully released its rotation will be stopped by engagement of pin 312 with hole 314.

Figure 20:
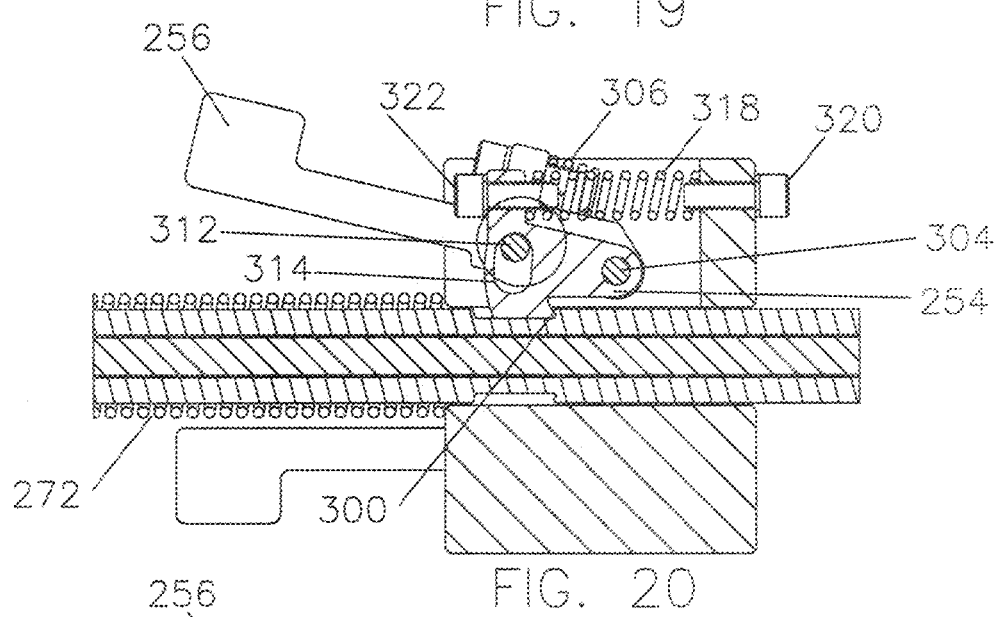
FIG. 20 is a cross section view of the centrifugal release taken along lines "19-19" of FIG. 17 showing the centrifugal release in the partially released condition.

Referring now to FIG. 20 which is a view similar to FIG. 19 taken along lines "18-18" of FIG. 17 shows release arm 256 swinging outwardly against the spring load of spring 306 until pin 312 contacts the side of slot 314 as shown. Pin 312 is part of release arm 256 and slot 314 is a part of latch arm 254. Latch arm 254 is pivotably mounted on axle 304 and is restrained in position by the spring load of spring 316 which is retained in position by bolts 320 and 322 as well as the sliding friction load on shoulder 300. This is important as the frictional load on shoulder 300 will vary with wind load as the wind load changes the load on spring 272. This change in load on spring 272 would make the rotary speed which the centrifugal release 132 would release unpredictable. By having the release arm which is only loaded by a simple spring swing to approximately twice the original radius at the before engaging the latch arm 254, the latch arm 254 will immediately be snatched out of the engaged position, giving a predictable release speed.

Figure 21:
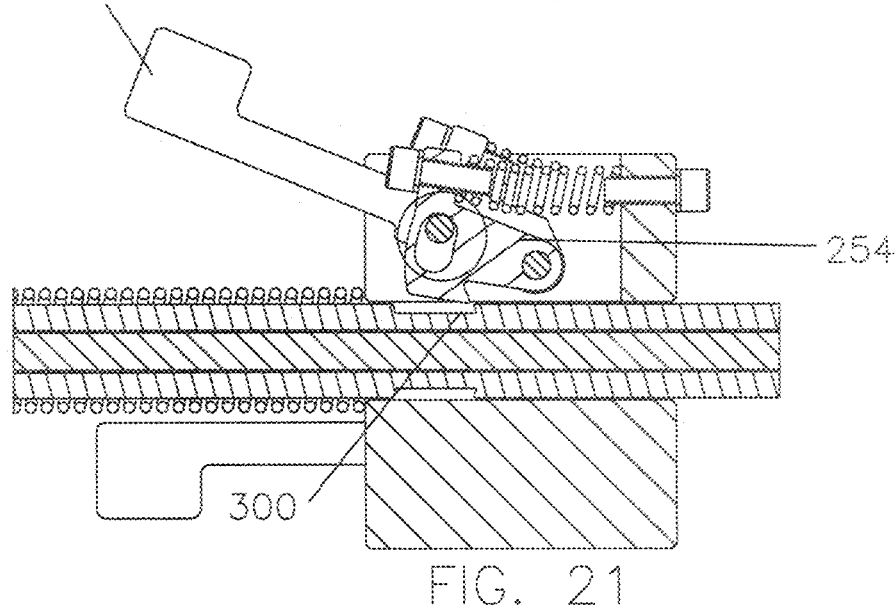
FIG. 21 is a cross section view of the centrifugal release taken along lines "18-18" of FIG. 17 showing the centrifugal release in the fully released condition.

Referring now to FIG. 21 which is a view similar to FIG. 19 showing the release arm 256 has pivoted further out about axle 304 with pin 312 pulling latch arm 254 out of the groove 330 allowing the centrifugal release 132 to move to the right in this figure, allowing the blades 34 to rotate to the fully faired position. This is the unset position. This will allow the blades 34 and centrifugal release 132 to stop rotating and allow springs 306 and 316 to return release arm 256 and latch arm to assume the original position when moved back to groove 330.

The particular embodiments disclosed above are illustrative only, as the invention may be modified and practiced in different but equivalent manners apparent to those skilled in the art having the benefit of the teachings herein. Furthermore, no limitations are intended to the details of construc- That which is claimed is:

1. The method of erecting a wind turbine, comprising
pivotably mounting the lower end of a mast on a side or end of a container,
connecting a first wire, rope, cable, or chain to the upper end of the mast and to the top end of an intermediate truss,
connecting a second wire, rope, cable, or chain to the top end of the intermediate truss and to a winch,
pivotably fixing a lower end of the intermediate truss to the container,
operating the winch to support a portion of the weight of the mast,
assembling the wind turbine on the mast,
operating the winch to move the mast and wind turbine to the vertical position,
engaging a second connection to fix the mast in the vertical position, and
releasing the wire, rope cable or chain from the upper end of the truss.

2. The method of claim 1, further comprising erecting of the wind turbine is done entirely by manual labor with no cranes required.

3. The method of claim 1, further comprising the container is a standard shipping container.

4. The method of claim 1, further comprising the bottom of blades of the wind turbine are at least seven feet above the top of the container.

5. The method of claim 4, further comprising the container containing batteries to store the energy collected by the wind turbine.

6. The method of claim 5, further comprising the container has a distribution panel to distribute the electricity stored in the batteries.

7. The method of claim 1, further comprising reversing the process to lower the wind turbine to near ground level for servicing and/or maintenance.

8. The method of claim 1, further comprising providing moving the intermediate truss back into the container.

9. The method of erecting a wind turbine, comprising
delivering the wind turbine in a container which can be offloaded from a truck or trailer without a crane,
pivotably mounting the lower end of a mast on a side or end of the container,
connecting a first wire, rope, cable, or chain to the upper end of the mast and to the top end of an intermediate truss,
connecting a second wire, rope, cable, or chain to the top end of the intermediate truss and to a winch,
pivotably fixing a lower end of the intermediate truss to the container,
operating the winch to support a portion of the weight of the mast,
assembling the wind turbine on the mast,
operating the winch to move the mast and wind turbine to the vertical positon, and
engaging a second connection to fix the mast in the vertical position'.

10. The method of claim 9, further comprising the erection of the wind turbine is done entirely by manual labor with no cranes required.

11. The method of claim 9, further comprising where the container is a standard shipping container.

12. The method of claim 9, further comprising the blades of the wind turbine are at least seven feet above the top of the container.

13. The method of claim 12, further comprising the container containing batteries to store the energy collected by the wind turbine.

14. The method of claim 13, further comprising the container contains a distribution panel to distribute the electricity stored in the batteries.

15. The method of claim 9, further comprising reversing the process to lower the wind turbine to near ground level for servicing and/or maintenance.

16. The method of claim 9, further comprising providing moving the intermediate truss back into the container.

17. The method of claim 9, further comprising the side of the blades which face the wind are behind the swivel bearings so that the wind turbine will always face into the wind.

* * * * *